US011366659B2

(12) United States Patent
Ravindranath et al.

(10) Patent No.: US 11,366,659 B2
(45) Date of Patent: Jun. 21, 2022

(54) METHOD AND SYSTEM FOR AUTOMATED CLASSIFICATION OF VARIABLES USING UNSUPERVISED DISTRIBUTION AGNOSTIC CLUSTERING

(71) Applicant: Tata Consultancy Services Limited, Mumbai (IN)

(72) Inventors: Yogananda Ravindranath, Chennai (IN); Tamildurai Mehalingam, Chennai (IN); Aditya Thuruvas Senthil, Chennai (IN); Reshinth Gnana Adithyan, Chennai (IN); Shrayan Banerjee, Chennai (IN); Balakrishnan Venkatanarayanan, Chennai (IN)

(73) Assignee: TATA CONSULTANCY SERVICES, LIMITED, Mumbai (IN)

( * ) Notice: Subject to any disclaimer, the term of this patent is extended or adjusted under 35 U.S.C. 154(b) by 0 days.

(21) Appl. No.: 17/181,010

(22) Filed: Feb. 22, 2021

(65) Prior Publication Data
US 2022/0083332 A1  Mar. 17, 2022

(30) Foreign Application Priority Data

Aug. 26, 2020 (IN) .............................. 202021036739

(51) Int. Cl.
*G06F 9/44* (2018.01)
*G06F 8/75* (2018.01)
(Continued)

(52) U.S. Cl.
CPC ................ *G06F 8/75* (2013.01); *G06F 8/427* (2013.01); *G06F 8/436* (2013.01); *G06F 8/73* (2013.01); *G06K 9/6218* (2013.01)

(58) Field of Classification Search
CPC ....................................................... G06F 8/75
(Continued)

(56) References Cited

U.S. PATENT DOCUMENTS 5,742,827 A   4/1998  Ohkubo et al.
7,640,532 B2  12/2009 Jain et al.
(Continued)

FOREIGN PATENT DOCUMENTS

WO  WO-2009102903 A2 *  8/2009 ............... G06F 8/30

OTHER PUBLICATIONS

Ankesh Anand et al. "Unsupervised State Representation Learning in Atari"; 33rd Conference on Neural Information Processing Systems (NeurIPS Jun. 2019), Vancouver, Canada.*
(Continued)

*Primary Examiner* — Francisco J Aponte
(74) *Attorney, Agent, or Firm* — Finnegan, Henderson, Farabow, Garrett & Dunner, LLP

(57) ABSTRACT

The ability to comprehend the context of a given programming artifact and extracting the underlying functionality is a complex task extending beyond just syntactic and semantic analysis of code. All existing automation capabilities, hence heavily depend on manual involvement of domain experts. Even recent approaches leveraging Machine Learning Capabilities are supervised techniques, whereby the dependency on domain experts still remains—in preparing suitable training sets. A method and system for automated classification of variables using unsupervised distribution agnostic clustering has been provided. The present disclosure focuses to tap the flexibility of the code and presents a domain agnostic approach using unsupervised machine learning which automatically extracts the context from source code, by classifying the underlying elements of the code. The method and system do not require any manual intervention and opens a wide range of opportunities in reverse engineering and variable level analysis space.

7 Claims, 6 Drawing Sheets

(51) Int. Cl.
*G06F 8/73* (2018.01)
*G06K 9/62* (2022.01)
*G06F 8/41* (2018.01)

(58) Field of Classification Search
USPC .......................................................... 717/120
See application file for complete search history.

(56) References Cited

U.S. PATENT DOCUMENTS

| | | | | |
|---|---|---|---|---|
| 8,732,727 | B2* | 5/2014 | Walsh | G06F 9/5061 |
| | | | | 719/318 |
| 9,858,054 | B2* | 1/2018 | Koju | G06F 8/4441 |
| 9,875,098 | B2 | 1/2018 | Mehalingam et al. | |
| 10,452,367 | B2 | 10/2019 | Allamanis et al. | |
| 10,489,151 | B1* | 11/2019 | Katan | G06F 8/73 |
| 10,782,945 | B1* | 9/2020 | Craik | G06F 8/443 |
| 10,809,984 | B2* | 10/2020 | Mizrahi | G06F 16/951 |
| 11,238,151 | B2* | 2/2022 | Kim | G06F 21/54 |
| 2015/0347129 | A1 | 12/2015 | Chittimalli et al. | |
| 2017/0046399 | A1* | 2/2017 | Sankaranarasimhan | |
| | | | | G06F 8/70 |
| 2017/0147475 | A1* | 5/2017 | Abadi | G06F 8/433 |
| 2018/0373507 | A1* | 12/2018 | Mizrahi | G06F 16/951 |
| 2019/0213139 | A1* | 7/2019 | Sharpe | G06F 12/1009 |
| 2019/0243622 | A1* | 8/2019 | Allamanis | G06F 11/3604 |
| 2021/0182284 | A1* | 6/2021 | Alsamarrie | G06F 16/2379 |
| 2021/0286718 | A1* | 9/2021 | Ravindar | G06F 8/436 |

OTHER PUBLICATIONS

Ashish Kumar Luhach et al. "Advanced Informatics for Computing Research"; Communications in Computer and Information Science—Second International Conference, ICAICR 2018 Shimla, India, Jul. 14-15, 2018; Revised Selected Papers, Part I.*

Yufan Guo et al. "Developing a Clustering Structure with Consideration of Cross-Domain Text Classification based on Deep Sparse Auto-encoder"; 2020 IEEE International Conference on Bioinformatics and Biomedicine (BIBM)—IEEE.*

Mark Ferguson et a. "Player Style Clustering without Game Variables"; FDG '20, Sep. 15-18, 2020, Bugibba, Malta.*

Chavent et al., "ClustOfVar: An R Package for the Clustering of Variables," Journal of Statistical Software, 50(13) (2012).

* cited by examiner

METHOD AND SYSTEM FOR AUTOMATED CLASSIFICATION OF VARIABLES USING UNSUPERVISED DISTRIBUTION AGNOSTIC CLUSTERING

PRIORITY CLAIM

This U.S. patent application claims priority under 35 U.S.C. § 119 to: India Application No. 202021036739, filed on Aug. 26, 2020. The entire contents of the aforementioned application are incorporated herein by reference.

TECHNICAL FIELD

The disclosure herein generally relates to field of source code analysis, and, more particularly, to a method and system for an automated classification of a plurality of variables in an application source code used in an IT application.

BACKGROUND

Every industry is either already part of the digital transformation era or are preparing themselves for the same with least impact to their existing business. This journey of modernization is often held with the dependency on the existing subject matter experts (SMEs). The ability to comprehend the business context of the code and extracting the underlying functionality is the most complex task. All the existing automation capabilities and even the machine learning based capabilities are supervised techniques and are dependent on manual intervention from domain experts who understand the business. This intervention becomes a show stopper especially in niche domains.

Apart from the syntax and the semantics of the code, the real ability to introduce richness in code functionality and ability to make a code perform a complex task comes with the use of variable in a code. This flexibility of variable usage generally brings the domain flavor/business context to the otherwise plain code. The information that can be extracted by analyzing this flexibility is ignored in most analysis.

SUMMARY

Embodiments of the present disclosure present technological improvements as solutions to one or more of the above-mentioned technical problems recognized by the inventors in conventional systems. For example, in one embodiment, a system for automated classification of a plurality of variables is provided. The system comprises an input/output interface, one or more hardware processors and a memory. The input/output interface provides an application source code as an input. The memory in communication with the one or more hardware processors, wherein the one or more first hardware processors are configured to execute programmed instructions stored in the one or more first memories, to: parse the application source code to extract the plurality of variables present in the application source code, wherein the plurality of variables have a plurality of data element properties; eliminate one or more intermediate transient variables out of the plurality of variables using a plurality of elimination methods; generate a plurality of vectors using the plurality of variables based on data element properties and relational weightage; apply a unsupervised distribution agnostic clustering (DAC) technique on the plurality of vectors based on a cluster size provided by a user, wherein the DAC technique results in generation of a set of sparse relational clusters and a first set of output clusters; apply a second level of unsupervised Distribution Agnostic Clustering technique to the sparse relational clusters to generate a set of property-based output clusters and append the property based output clusters to the first set of clusters to get the final set of output clusters; and apply a cluster naming technique on the first set and the second set of output clusters to name the clusters of the plurality of variables.

In another aspect, a method for automated classification of a plurality of variables is provided. Initially, an application source code is received as an input via a user interface. In the next step, the application source code is parsed to extract the plurality of variables present in the application source code, wherein the plurality of variables have a plurality of properties and relations. Further, one or more intermediate transient variables are eliminated out of the plurality of variables using a plurality of elimination methods. Further, a plurality of vectors is generated using the plurality of variables based on data element properties and relational weightage. In the next step, an unsupervised distribution agnostic clustering (DAC) technique is applied on the plurality of vectors based on a cluster size provided by a user, wherein the DAC results in generation of a set of sparse relational clusters and a first set of output clusters. Further, a second unsupervised DAC technique is applied based on properties for the set of sparse relational clusters to generate a property based output clusters and append the property based output clusters to the first set and derive a final set of output clusters. And finally, a cluster naming algorithm is applied on the output clusters to name the clusters of the plurality of variables.

In another aspect the embodiment here provides one or more non-transitory machine readable information storage mediums comprising one or more instructions which when executed by one or more hardware processors cause automated classification of a plurality of variables is provided. Initially, an application source code is received as an input via a user interface. In the next step, the application source code is parsed to extract the plurality of variables present in the application source code, wherein the plurality of variables have a plurality of properties and relations. Further, one or more intermediate transient variables are eliminated out of the plurality of variables using a plurality of elimination methods. Further, a plurality of vectors is generated using the plurality of variables based on data element properties and relational weightage. In the next step, an unsupervised distribution agnostic clustering (DAC) technique is applied on the plurality of vectors based on a cluster size provided by a user, wherein the DAC results in generation of a set of sparse relational clusters and a first set of output clusters. Further, a second unsupervised DAC technique is applied based on properties for the set of sparse relational clusters to generate a property based output clusters and append the property based output clusters to the first set and derive a final set of output clusters. And finally, a cluster naming algorithm is applied on the output clusters to name the clusters of the plurality of variables.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
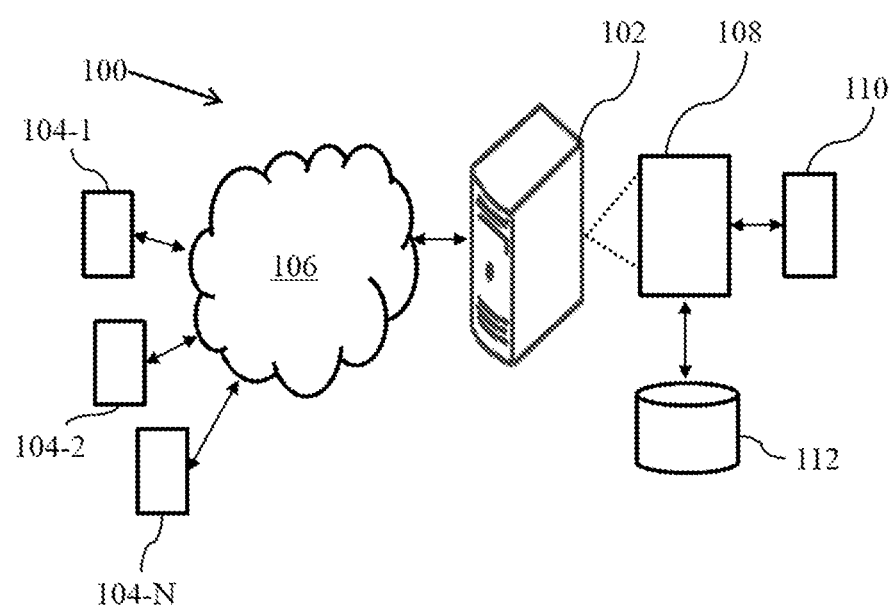
FIG. 1 illustrates a block diagram of a system for automated classification of a plurality of variables according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Available automation techniques for variable classification (including the previously used ML based variable classification methods) require a laborious and time-consuming human involvement to prepare the training set. In the existing scenarios, knowledge about the application and ensuring that the correct inputs are provided during the training becomes essential. Though there might be a business push, the transformation decision and the time to transform is proportional based on the knowledge about their existing IT applications.

The present disclosure focuses to tap the flexibility of the code and presents a domain agnostic approach aided by unsupervised machine learning algorithms which automatically extracts the business context from the source code itself by classifying the underlying elements of the code. The method and system does not require any interventions from the subject matter experts/domain experts.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method. The automated variable classification model does a complete clustering of the variables and groups them together based on its properties and relations.

Figure 2:
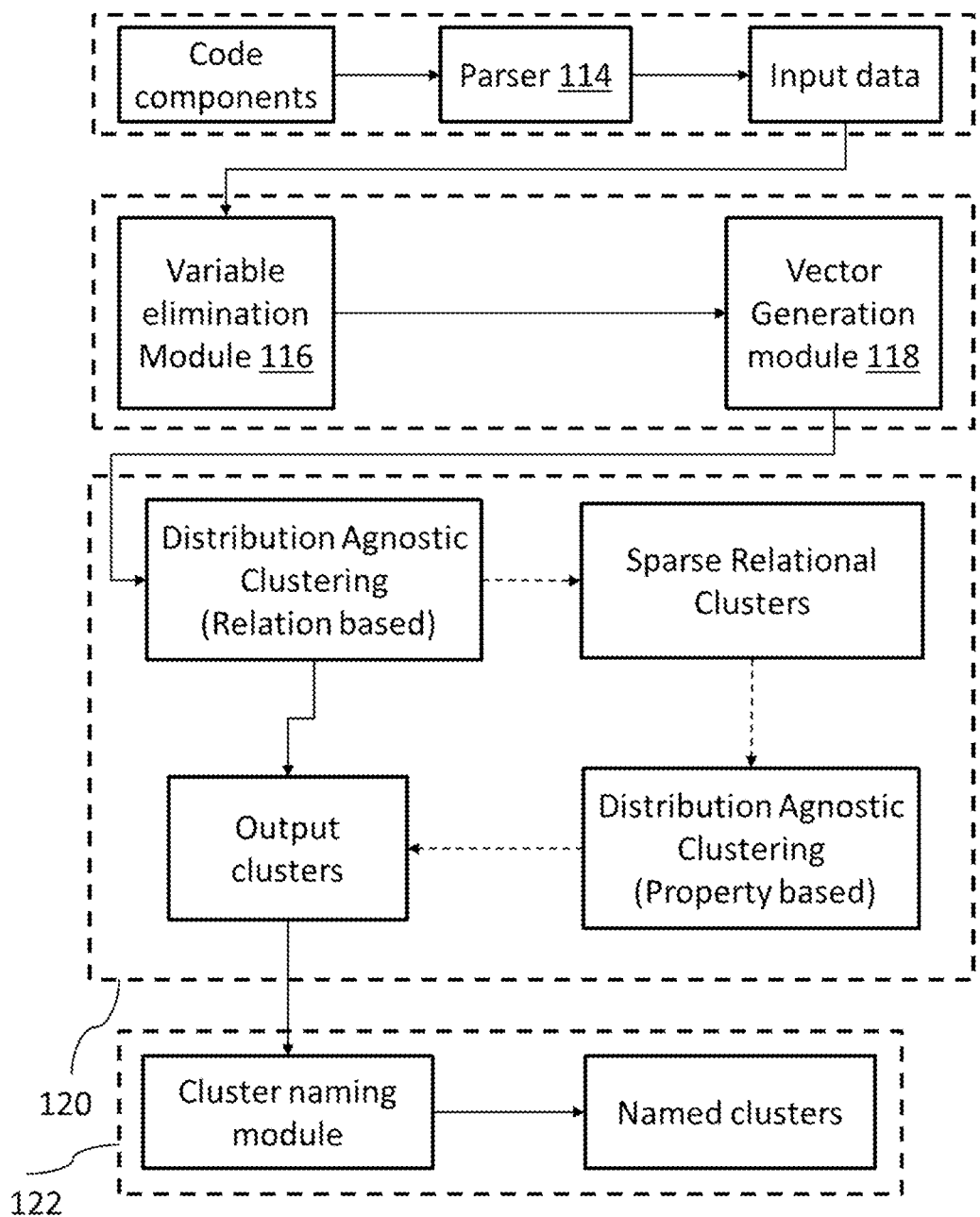
FIG. 2 is a functional block diagram of the system of FIG. 1 according to some embodiments of the present disclosure.
Figure 3:
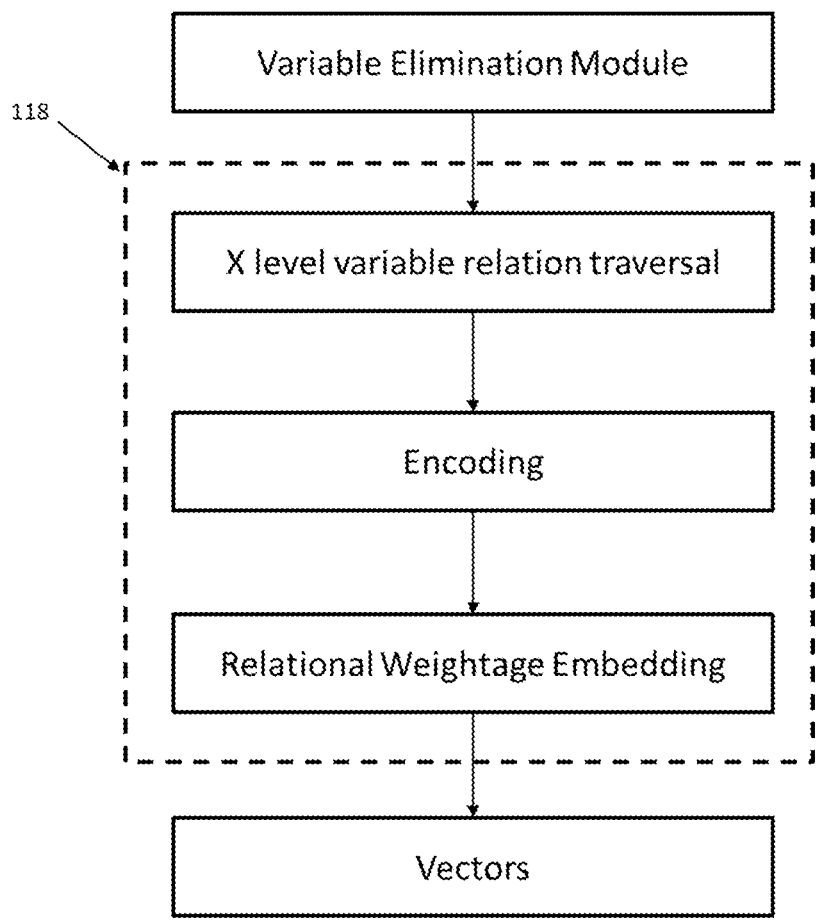
FIG. 3 illustrates a block diagram showing analysis based on relation of variables according to some embodiments of the present disclosure.

FIG. 1 illustrates a network diagram and FIG. 2 is a block diagram of a system 100 for automated classification of a plurality of variables, in accordance with an example embodiment. It should be appreciated that the plurality of variables is not only limited to variables defined in an application source code. The plurality of variables may also include data elements, or fields interfacing with the application and used in the application source code. Thus the plurality of variables and the data elements may be interchangeably in the present disclosure. Although the present disclosure is explained considering that the system 100 is implemented on a server, it may also be present elsewhere such as a local machine. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the memory 110 further comprises a plurality of modules. The plurality of modules are configured to perform various functions. The plurality of modules comprises a parser 114, a variable elimination module 116, a vector generation module 118, a clustering module 120 and a cluster naming module 122.

According to an embodiment of the disclosure, the parser 114 is configured to parse an application source code. The application source code is received as an input via the I/O interface 104. The parsing is done to extract the plurality of variables present in the application source code. The plurality of variables have a plurality of data element properties and relational weightage based on its relations with plurality of variables. The plurality of data element properties comprises data type, data size and structure, scope of the variable. The application source code is fed into technology specific parsers which can understand the syntax of the code. The parsers scan through each and every character in the code and extracts all the properties of the variables (like size, data type, structure, scope etc.). This also extracts the information on how one variable is linked with another variable.

According to an embodiment of the disclosure, the variable elimination module 116 is configured to eliminate one or more intermediate transient variables out of the plurality of variables using a plurality of elimination methods. The variable elimination module 116 uses the application source code and extracts the properties, relationships of the variable. Based on this information a variable filter is applied and all the intermediate transient variables are eliminated.

In an example of the disclosure, a deterministic logic is used to filter out the intermediate transient variables used in the application source code: The logics are and not restricted to as follows: based on the variables threshold of assignments or relations, or, based on variables scope and usage like the technical variables which comes after DB statement or, variables that are being used only to exchange data, loop iterators, etc. All those variables will be eliminated by the Variable Elimination Module.

According to an embodiment of the disclosure, the vector generation module 118 is configured to generate a plurality of vectors using the plurality of variables based on data element properties and relational weightage. The cluster size will be predefined or provided by the user. A specific cluster size is given which only acts as a maximum threshold for each cluster. Clusters with number of entities lower than the specified number may exist but never greater than the specified number.

According to an embodiment of the disclosure, the vector encoding can be based on a) the relation analysis or b) analysis based on variable properties. In the case of relation based analysis, the variables are encoded based on the depth of the relations, weightage of the relations as shown in the block diagram of FIG. 3. As an output of the previous analysis, the complete list of relations between the variables is extracted. The depth of relations is fetched as input X. Assume the number of variables to be N. Based on the relations available till depth X, the relationship knowledge is encoded into N×N matrix.

Data elements have relation between each other, giving weightage on how each data element are related to each other. For example, variables containing same type of data have more weightage. When the data is vectorized, this weightage plays a role. The mathematical form evolves based on the weightage embedding.

Weightage is given to vectors based on multiple factors. Firstly, the level in which two variables are related, For example, in the following two relations, move (a,b) and move (b,c), a-c related to each other in 2nd level whereas a-b and b-c are related in 1st level. So, 1st level relations have more weightage than 2nd level and so on.

And secondly, the type of relations between two variables. If two variables are related to each other due to assignment operation being performed, then they would have a different weightage on their vector when compared to two variable being added or some other operation being performed. It should be appreciated that currently these weightages are being used, but necessarily need not limit to only these weightages to be added.

According to an embodiment of the disclosure, the memory 110 further comprise the clustering module 120. The clustering module 120 is configured to apply a distribution agnostic clustering (DAC) algorithm on the plurality of vectors based on the cluster size, wherein the relation-based DAC algorithm results in generation of a set of spare relational clusters and a first set of output clusters.

All the existing clustering algorithms as on date, follow a trend of having input parameters which are either, 1) Total Number of Clusters, or 2) Data Space related parameters (require a threshold value which says, the maximum distance, for two points to belong into a same cluster)

The created clusters with these algorithms would tend to be of similar/homogeneous sizing based on the given input. The interpretation would be that number of cluster based methods or density-based methods can never be suitable parameter for clusters of heterogeneous sizing (based on different precisions).

Example: Consider 1000 variables and the number of clusters as 15. The clustering algorithm tends to create cluster groups having a range of 50-75 variables in each cluster. This type of clustering repels very much from the ideation of the present use case which resulted in formulation of the following methodology. This method is highly scalable and efficient to the problem which the system 100 is trying to address.

Figure 4:
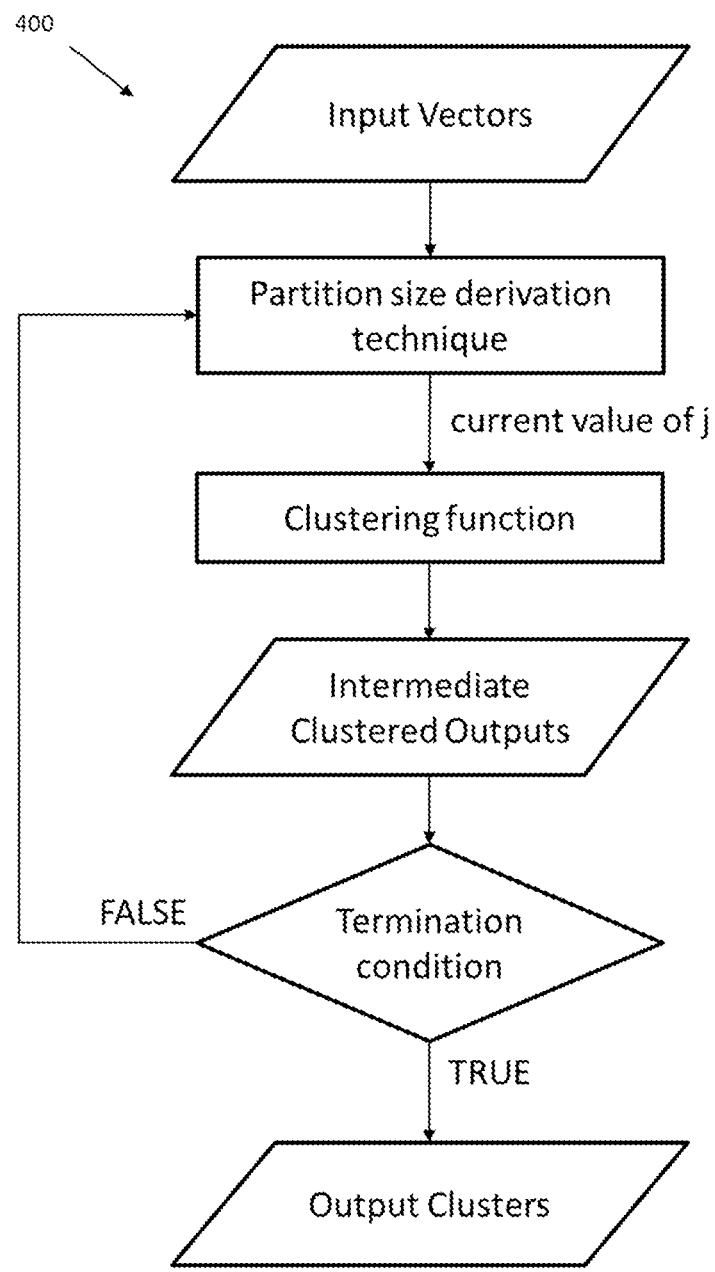
FIG. 4 shows a flowchart showing distribution agnostic clustering algorithm according to an embodiment of the present disclosure.

According to an embodiment of the disclosure, a flowchart 400 for distribution agnostic clustering algorithm as shown in FIG. 4, when a given a set of vectors and a threshold value on how big a cluster can be, follows the approach of divisive clustering. In contrast to the conventional divisive clustering methods as on date, the disclosed methodology completely depends only on the maximum cluster size threshold that is taken as input and automatically estimates the number of clusters (j) for each recursion. It starts by partitioning the entire space into j clusters. For the clusters having sizes that are higher than the Threshold, it recursively takes every cluster obtained by the partition, derives the new value of j and partitions it again. The operation is repeatedly done until the entirety has no clusters which has data points more than the specified Threshold. One of the major advantages is that the Clusters obtained are spatially cohesive with each other. Partitioning needs to be done properly and efficiently every time to reduce the number of recursions and have an improved performance. To ensure proper partitioning, choosing appropriate Number of Clusters (j) at the start of every recursion is important. This is done by having a view on the data distribution property.

Number of clusters (j) is derived for each recursion from the Total data points to be clustered and the input threshold. This emulates each cluster to have range of distribution. Contradicting to n-partitioning (most frequently used bi-partitioning), this approach saves a lot of recursion to reach to the appropriate cluster.

$$j=\text{func}(x,y)$$

where, x is the Total number of datapoints
y is the input threshold
func is the ratio of the total number of datapoints to the input threshold rounded off to the largest whole number
Illustration:
X={(1,1), (2,2), (4,4), (44,44), (49,49), (47,47)}
Threshold Size=2
Number of Clusters (j)=func(5,2)=3 (- -)
Iteration-1:
Cluster-1={(1,1), (2,2), (4,4)}, Centroid-1=(2.5,2.5) [In the plane]
Centroid-Point1—(2,2) [Centroids and centroid Points may (or) may not be the same. Reason being, at times the computed centroid might not be a discrete data point. In such a case the closest point to the computed centroid is chosen and it's intuitively correct]
Cluster-2={(44,44), (49,49),(47,47)}, Centroid-2=(46,46) [In the plane] Centroid-Point2—(44,44)
Iteration-2: (Cluster-1 is clustered again, since the threshold is not met)
Number of Clusters(j)=func(3,2)=2
Cluster-1.1={(1,1)} Centroid-1.1=(1.2,1.2) [In the plane] Centroid-Point1.1—(1,1)
Cluster-1.2={(2,2), (4,4)} Centroid-1.2=(3,3) [In the plane] Centroid-Point1.2—(2,2)
Same is applied to the Cluster-2 to obtain Cluster-2.1 and Cluster-2.2. By observing it is clear that the subspaces are in spatial cohesiveness with each other. The entire process can be defined as below.

Definition

Let V be the given Vector Space. Let $\alpha$ be the threshold of the maximum number of elements allowed in a Cluster C and V={$v_1, v_2, \ldots, v_k$}, where k=Number of Elements of the Dataset and $V_i$ refers to a subset of vectors being processed in a particular recursion. The technique initially computes the value of j and starts to partition the given set of Vectors $V_i$ into $C_{i1}, C_{i2} \ldots C_{ij}$. The process is repeated until the Condition $\alpha_{Ci} > \alpha$ is met for all $C_i$. All C={($C_{11} \ldots C_{ij}$)} are in equivalence with U={$U_{11}, \ldots U_{ij}$} $\in$V, where j is the estimated number of clusters for that particular recursion Every cluster formed is considered as a separate Vector Subspace Uij $\in$V. Each subspace adheres vector-subspace property. Each time a subspace is reached, the logic reinitializes the clusters and iterates to fit to an appropriate centroid. The centroids are within the Subspace and are found to be in superposition to the actual Vector Space.

According to an embodiment of the disclosure, the clustering module 120 is also configured to apply a second unsupervised DAC for the set of sparse relational clusters to generate a second set of output clusters to be appended to the first cluster outputs, wherein the second clustering is applied only if there are availability of sparse relational variables.

There is a possibility of both properties being used parallel instead of sequential. This is done by a combination of both type of information (relational and property) into vectors, to recursively cluster and obtain results.

Figure 5:
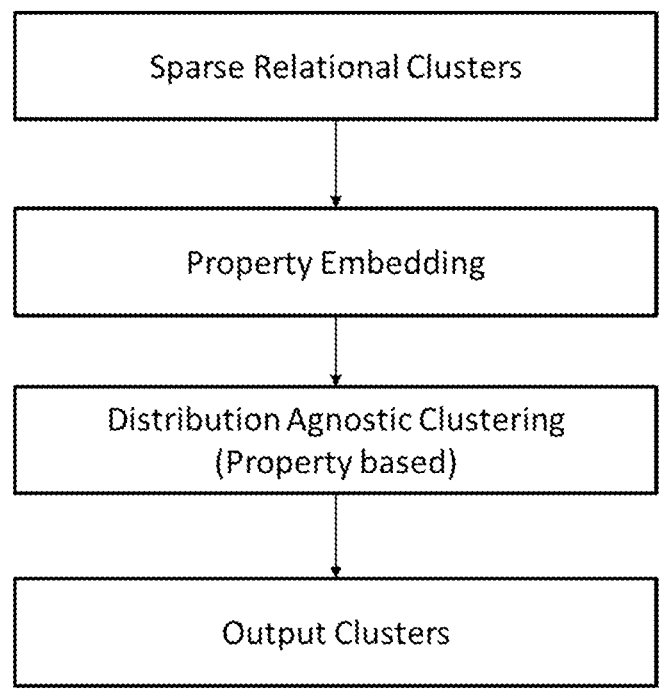
FIG. 5 illustrates a block diagram showing analysis based on variable properties according to some embodiment of the present disclosure.

According to an embodiment of the disclosure, the analysis based on variable properties is shown in the block diagram of FIG. 5. For variables which do not have the required depth in relations, the properties are embedded into the variables and DAC based on the properties, the analysis is performed.

According to an embodiment of the disclosure, the analysis is based on variable properties: There are cases where variables have lesser information compared to the minimal relational depth expected. In those cases, trying to cluster the variables through relations will fail and result in generation of lot of invalid clusters. Also, the N×N matrix becomes so sparse on vectorizing them and due to this, the generic clustering algorithms will fail. In those cases, this model clubs the Variable properties along with the relations. This information is fed into advanced clustering algorithms that clusters variables based on its properties. These techniques use dissimilarities (that is, quantification of the total mismatches between two objects): the smaller this number, the more similar the two objects. The remaining variables are clustered based on this and added to the first set of output clusters to get the final set of output clusters According to an embodiment of the disclosure, the memory 110 comprises the cluster naming module 122. The cluster naming module 122 is configured to apply a cluster naming algorithm on the final set of output clusters to name the each of the final set of clusters of the plurality of variables. Three types of techniques can be used for cluster naming: centroid analysis, recurring sub term, deterministic algorithm. Though it should be appreciated that the use of any other technique for cluster naming is well within the scope of this disclosure.

In the centroid analysis, it is assumed that each cluster will have one or more related variables, so this methodology tries to name the clusters by determining the centroid of the clusters of the related variables. For example, if a Cluster 1 has following variables
WS-STATE-CODE
L-STATE-TYP
STATE-CD
The centroid of the cluster 1 is STATE-CD, and this cluster will be named based on STATE-CD by expanding the terms as State Code In the recurring sub term algorithm, the naming of a data element can be made of a combination of multiple sub terms. After clustering all the related data elements into one cluster, the recurring terms in the data element names can give insights on the name of the cluster. Assuming the following data element terms in a cluster: STATE-CD, ST-CODE, STATE-CODE, WS-STATE-CODE, WS-ST-CODE Thus, sub term frequency in decreasing order will be
CODE—4
STATE—3
WS—2
CD—1
The given cluster could represent STATE CODE can be derived through this.

Deterministic algorithm refers to list of specific improvisations when the output from centroid analysis or recurrent term analysis might not provide the exact cluster name. For instance, a cluster made of the below list of data elements that could represent the "duration" being computed and might not get a correct name from centroid analysis or recurrent term analysis
WS-DD
WS-DATE
WS-MM WS-DD-MM-YY
DD-MM-YY
In such cases, application specific deterministic improvisations would provide proper naming to the clusters Further, any program specific variable names that has been used that only a human can figure out or, which cannot be perfectly captured by the centroid logic or recurring term logic. For example, if a cluster has contents such as:
XYZ-VAR1
COUNT-XYZ
XYZ-SUM The term XYZ might mean something specific contextually that the user would know. Hence using that information, a deterministic logic will be implemented to name such ambiguous clusters.

It should be appreciated that the automatic variable classification helps in understanding the domain and the business context of the source code. This knowledge opens up a wide range of solutions in the reverse engineering and variable level analysis. For example, automated data dictionary generation, unprincipled variable detection, field expansion, automated source code documentation etc.

Figure 6:
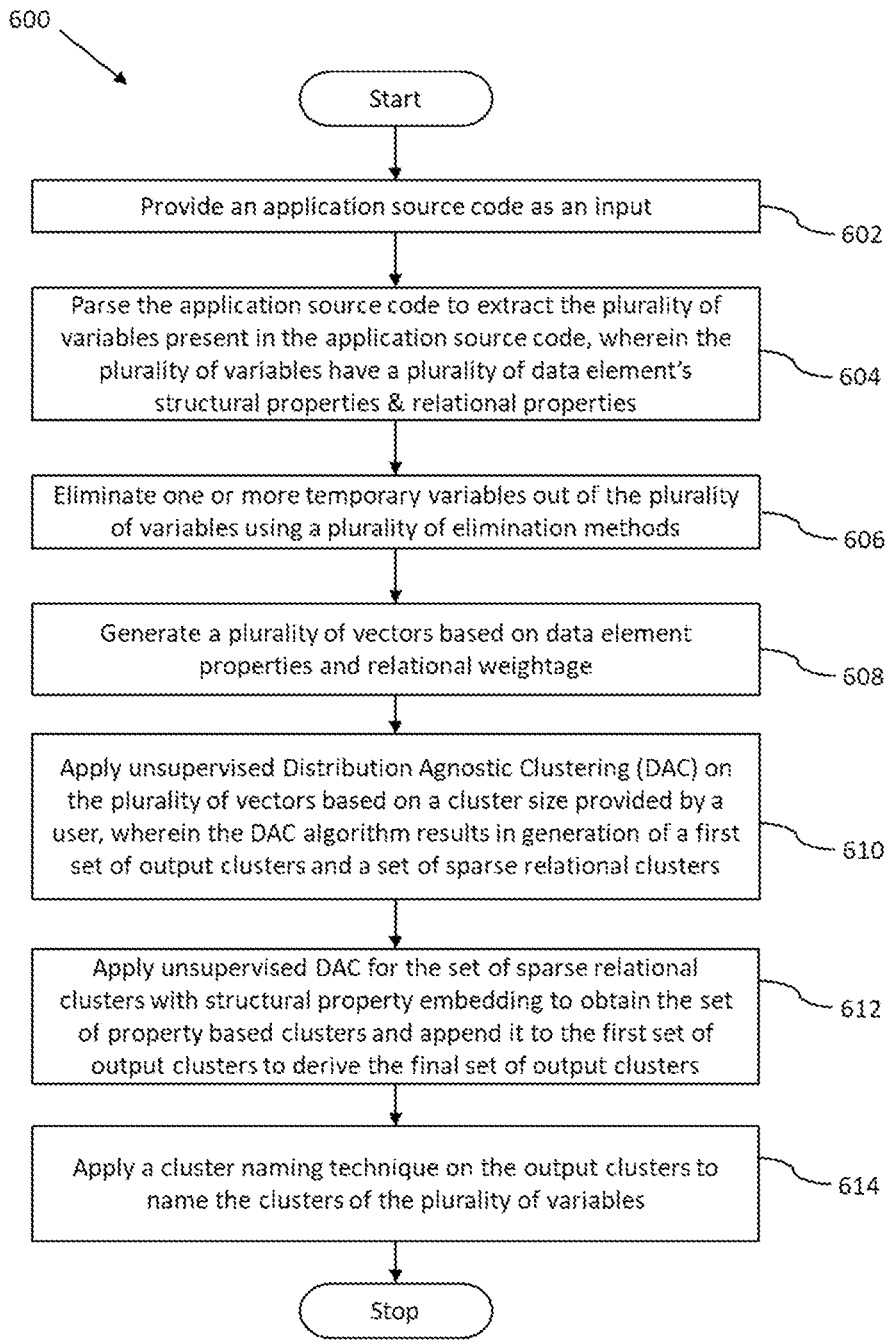
FIG. 6 illustrates a flowchart of a method for automated classification of a plurality of variables in accordance with some embodiments of the present disclosure.

In operation, a flowchart 600 for automated classification of a plurality of variables is shown in FIG. 6. Initially at step 602, the application source code is provided as an input. The application source code can be taken from any application and it is language agnostic, code can be written in any language. At step 604, the application source code is parsed to extract the plurality of variables present in the application source code, wherein the plurality of variables have plurality of data element properties and the same is extracted. At step 606, one or more intermediate transient variables are eliminated out of the plurality of variables using a plurality of elimination methods. At step 608, a plurality of vectors is generated using the plurality of variables based on data element properties and relational weightage.

At step 610, the unsupervised DAC technique is applied on the plurality of vectors based on a cluster size provided by the user, wherein the unsupervised DAC technique results in generation of a first set of output clusters and set of sparse relational clusters. Further at step 612, the second unsupervised DAC technique is applied for the set of sparse relational clusters to generate property-based clusters and append the same to first set to derive the final set of output clusters. And finally, at step 614, the cluster naming technique is applied on the first set and the second set of output clusters to name the clusters of the plurality of variables. In the present example, centroid analysis, recurrent sub-term technique or deterministic techniques are applied.

According to an embodiment of the disclosure, the system 100 can also be implemented on the graphic processing unit (GPU) as compared to a normal computer processing unit (CPU). In light of the present disclosure, the use of GPU is to accelerate the various types of clustering algorithms is also covered.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of effective variable classification without the involvement of subject matter expert. The embodiment thus provides the method and system for automated classification of a plurality of variables.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:
1. A processor implemented method for automated classification of a plurality of variables, the method comprising:
receiving, via a user interface, an application source code as an input;
parsing, via one or more hardware processors, the application source code to extract the plurality of variables present in the application source code, wherein the plurality of variables have a plurality of properties and relations;
eliminating, via the one or more hardware processors, one or more intermediate transient variables out of the plurality of variables using a plurality of elimination methods;
generating, via the one or more hardware processors, a plurality of vectors using the plurality of variables based on data element properties and relational weightage;
applying, via the one or more hardware processors, an unsupervised distribution agnostic clustering (DAC) technique on the plurality of vectors based on a cluster size provided by a user, wherein the DAC results in generation of a set of sparse relational clusters and a first set of output clusters;

applying, via the one or more hardware processors, a second unsupervised DAC technique based on properties for the set of sparse relational clusters to generate property based output clusters and append the property based output clusters to the first set and derive a final set of output clusters; and applying, via the one or more hardware processors, a cluster naming algorithm on the final set of output clusters to name the each of the final set of clusters of the plurality of variables.

2. The method of claim 1, wherein the plurality of clusters are classified based on properties and weightage of relations between the plurality of variables.

3. The method of claim 1, wherein the cluster naming technique is applied using one or more of method:
   based on recurring sub term;
   based on centroid analysis; or
   based on deterministic models.

4. The method of claim 1, wherein the plurality of data element properties comprises data type, data size, structure and scope of the variable.

5. The method of claim 1, wherein the plurality of variables elimination method uses the application source code and extracts the properties, relationships of the plurality of variables.

6. A system for automated classification of a plurality of variables, the system comprises:
   an input/output interface for receiving an application source code as an input;
   one or more hardware processors;
   a memory in communication with the one or more hardware processors, wherein the one or more first hardware processors are configured to execute programmed instructions stored in the one or more first memories, to:
      parse the application source code to extract the plurality of variables present in the application source code, wherein the plurality of variables have a plurality of data element properties;
      eliminate one or more intermediate transient variables out of the plurality of variables using a plurality of elimination methods;
      generate a plurality of vectors using the plurality of variables based on data element properties and relational weightage;
      apply a unsupervised distribution agnostic clustering (DAC) technique on the plurality of vectors based on a cluster size provided by a user, wherein the DAC technique results in generation of a set of sparse relational clusters and a first set of output clusters;
      apply a second level of unsupervised Distribution Agnostic Clustering technique to the sparse relational clusters to generate a set of property-based output clusters and append the property based output clusters to the first set of clusters to get the final set of output clusters; and
      apply a cluster naming algorithm on the final set of output clusters to name the each of the final set of clusters of the plurality of variables.

7. One or more non-transitory machine readable information storage mediums comprising one or more instructions which when executed by one or more hardware processors cause managing a plurality of events, the instructions cause:
   receiving, via a user interface, an application source code as an input;
   parsing the application source code to extract the plurality of variables present in the application source code, wherein the plurality of variables have a plurality of properties and relations;
   eliminating one or more intermediate transient variables out of the plurality of variables using a plurality of elimination methods;
   generating a plurality of vectors using the plurality of variables based on data element properties and relational weightage;
   applying an unsupervised distribution agnostic clustering (DAC) technique on the plurality of vectors based on a cluster size provided by a user, wherein the DAC results in generation of a set of sparse relational clusters and a first set of output clusters;
   applying a second unsupervised DAC technique based on properties for the set of sparse relational clusters to generate property based output clusters and append the property based output clusters to the first set and derive a final set of output clusters; and
   applying a cluster naming algorithm on the final set of output clusters to name the each of the final set of clusters of the plurality of variables.

* * * * *